United States Patent
Li et al.

(10) Patent No.: US 6,631,420 B1
(45) Date of Patent: Oct. 7, 2003

(54) REDUCING CONVERGENCE TIME BY A PROTOCOL INDEPENDENT MULTICAST (PIM) ROUTER

(75) Inventors: Yunzhou Li, Lowell, MA (US); Billy Ng, Revere, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/257,866

(22) Filed: Feb. 25, 1999

(51) Int. Cl.$^7$ .............................. G06F 15/173
(52) U.S. Cl. ................. 709/242; 709/235; 709/239; 709/240; 709/241; 709/243; 370/254; 370/408
(58) Field of Search ................. 709/235, 242, 709/239, 240, 241, 243; 370/254, 408

(56) References Cited

U.S. PATENT DOCUMENTS

| | | | |
|---|---|---|---|
| 5,361,256 A | * 11/1994 | Doeringer et al. | 370/390 |
| 5,574,860 A | * 11/1996 | Perlman et al. | 709/220 |
| 5,946,316 A | * 8/1999 | Chen et al. | 370/408 |
| 5,963,540 A | * 10/1999 | Bhaskaran | 370/218 |
| 6,032,194 A | * 2/2000 | Gai et al. | 709/239 |
| 6,078,590 A | * 6/2000 | Farinacci et al. | 370/432 |
| 6,188,694 B1 | * 2/2001 | Fine et al. | 370/402 |
| 6,219,739 B1 | * 4/2001 | Dutt et al. | 710/129 |
| 6,226,684 B1 | * 5/2001 | Sung et al. | 709/238 |
| 6,424,629 B1 | * 7/2002 | Rubino et al. | 370/241.1 |

OTHER PUBLICATIONS

Estrin, Farinacci, Helmy, Thaler, Deering, . . . Protocol Independent Multi–cast–Sparese Mode (Pim–Sim) : Protocol Specification Internet Article, Online! Jun. 1, 1998 pp. 1–66 Retrieved from the Internet: <URL:http://www.ietf.org/rfc/rfc2362.txt? number=2362>.

Perkins: "RFC 2002: IP Mobility Support" Internet Article, Online! Oct. 1, 1996, pp. 1–79, XP002211804 Retrieved from the Internet: <URL:http:// www.ietf.org/rfc/rfc2002.txt.

* cited by examiner

*Primary Examiner*—Saleh Najjar
(74) *Attorney, Agent, or Firm*—Steubing McGuinness & Manaras LLP

(57) ABSTRACT

A technique for reducing reconvergence time by a reconverging device in a PIM-SM domain of a communication system involves sending by the reconverging device to a neighboring device a reconvergence message including a reconvergence indicator, such as a randomly selected Generation Identifier value. In response to the reconvergence message, the neighboring device sends to the reconverging device a PIM Bootstrap Message identifying the Rendezvous Point devices in the PIM-SM domain. The reconverging device creates the appropriate PIM-SM states for the Rendezvous Point devices. Additionally, the neighboring device sends to the reconverging device a PIM Join/Prune Message for each multicast group for which the neighboring device supports a downstream multicast group member. The reconverging device creates the appropriate routing entries for the multicast group memberships, and forwards each PIM Join/Prune Messages towards its corresponding Rendezvous Pointer device. Additionally, the reconverging device detects any directly connected multicast group members, and sends to the neighboring device a PIM Join/Prune Message for each multicast group for which the reconverging device supports a directly connected multicast group member.

40 Claims, 6 Drawing Sheets

REDUCING CONVERGENCE TIME BY A PROTOCOL INDEPENDENT MULTICAST (PIM) ROUTER

FIELD OF THE INVENTION

The present invention relates generally to communication systems, and more particularly to reducing reconvergence time by a Protocol Independent Multicast (PIM) router.

BACKGROUND OF THE INVENTION

In today's information age, communication networks are often used for transporting information from an information provider to one or more information consumers.

One technique for transporting information from an information provider to a group of information consumers over the communication network is known as "multicasting." Multicasting allows the information provider (referred to hereinafter as a "multicast source") to transmit a single unit of multicast information (referred to hereinafter as a "multicast packet") simultaneously to all information consumers (referred to hereinafter individually as a "multicast client" and collectively as "multicast clients") in the multicast group, specifically by addressing the multicast packet to the multicast group using a multicast address. The multicast clients monitor the communication network for multicast packets addressed to the multicast group.

In order to transport a multicast packet from the multicast source to the multicast clients, the multicast packet is routed through the communication network by a number of multicast routers. The multicast routers utilize a specific multicast routing protocol to determine a multicast distribution tree by which the multicast packet is distributed.

One such multicast routing protocol is the Protocol Independent Multicast—Sparse Mode (PIM-SM) protocol, which is described in the document Internet Engineering Task Force (IETF) Request For Comments (RFC) 2362 entitled *Protocol Independent Multicast—Sparse Mode (PIM-SM): Protocol Specification* and published in June 1998, hereby incorporated by reference in its entirety. In accordance with the PIM-SM protocol, the various routers within a particular PIM-SM domain establish a default multicast distribution tree, referred to as a "shared tree," for each multicast group. Each shared tree is rooted at a Rendezvous Point (RP) router that acts as the distribution point of all multicast packets for the multicast group. Before a router can join the shared tree for a particular multicast group, the router must learn the identity of the multicast group RP router. A router learns the identity of the multicast group RP router by receiving a PIM Bootstrap Message including a list of all RP routers in the PIM-SM domain. The router receives the PIM Bootstrap Message either from a Bootstrap Router, which sends the PIM Bootstrap Message to all routers in the PIM-SM domain at predetermined intervals (typically every 60 seconds), or from a neighboring router, which sends the PIM Bootstrap Message to the router if and only if the neighboring router has lost contact with the router for a predetermined period of time (typically 105 seconds). Upon learning the identity of the multicast group RP router, or at any time thereafter, each router that supports a downstream multicast group member (i.e., multicast client) joins the shared tree by sending a PIM Join/Prune Message hop-by-hop toward the multicast group RP router. Each intermediate router that receives the PIM Join/Prune Message from a downstream router also joins the shared tree by forwarding the PIM Join/Prune Message toward the multicast group RP router.

In order to distribute multicast packets for a particular multicast group, each multicast source sends multicast packets to the corresponding multicast group RP router, which in turn forwards the multicast packets according to the shared tree. Each router that receives the multicast packets, including the multicast group RP router, forwards the multicast packets to any and all neighboring routers from which it received the PIM Join/Prune Message. In this way, the multicast packets are only distributed to routers that support a downstream multicast group member.

In order to maintain the shared tree, each router sends a PIM Hello message to its neighboring router(s) at predetermined intervals (typically every 30 seconds). The PIM Hello messages allow a particular router to determine whether or not a particular neighboring router is operational. If a particular router fails to receive a PIM Hello message from a particular neighboring router within a predetermined period of time (typically 105 seconds), then the neighboring router is considered to have failed.

When a router in the shared tree reboots, it can take a substantial amount of time for the rebooted router to reconverge such that it resumes forwarding multicast packets for the multicast group. This is because the rebooted router must at least learn the identity of the multicast group RP router before it can forward any multicast packets over the shared tree. In a typical PIM-SM implementation, a Bootstrap Router in the PIM-SM domain sends a PIM Bootstrap Message identifying each RP router in the PIM-SM domain every 60 seconds, so it can take up to 60 seconds for the rebooted router to learn the identity of the multicast group RP router. After learning the identity of the multicast group RP router, the rebooted router may then need to learn the forwarding states for any downstream multicast group members (i.e., the rebooted router needs to create the appropriate routing entries for forwarding multicast packets to any downstream multicast group members). In a typical PIM-SM implementation, each neighboring router that supports a downstream multicast group member sends a PIM Join/Prune Message every 60 seconds, so it can take up to 60 second for the rebooted router to learn the forwarding states for any downstream multicast group members after learning the identity of the multicast group RP router. Therefore, in a worst case scenario, it can take up to 120 seconds for the rebooted router to reconverge, during which time all multicast packets received by the rebooted router are dropped. Additionally, in most cases, the neighboring router(s) will consider the rebooted router to be operational, since the rebooted router typically becomes operational and resumes sending PIM Hello messages before the neighboring router(s) detect the failure (i.e., within 105 seconds).

Thus, a technique for reducing reconvergence time following a router reboot is needed.

SUMMARY OF THE INVENTION

In accordance with one aspect of the invention, a reconverging router in a PIM-SM domain sends to a neighboring router a reconvergence message including a reconvergence indicator. The reconvergence message is preferably a PIM Hello Message, and the reconvergence indicator is preferably a randomly selected Generation Identifier value that is included in a novel Generation Identifier Option field within the PIM Hello Message. The reconverging router receives from the neighboring router a PIM Bootstrap Message identifying the Rendezvous Point routers in the PIM-SM domain. Additionally, the reconverging router sends to the neighboring router a PIM Join/Prune Message for each multicast group for which the reconverging router supports a directly connection multicast group member.

In accordance with another aspect of the invention, a neighboring router in a PIM-SM domain receives from a reconverging router a reconvergence message including a reconvergence indicator. The reconvergence message is preferably a PIM Hello Message, and the reconvergence indicator is preferably a randomly selected Generation Identifier value that is included in a novel Generation Identifier Option field within the PIM Hello Message. The neighboring router sends to the reconverging router a PIM Bootstrap Message identifying the, Rendezvous Point routers in the PIM-SM domain. Additionally, the neighboring router sends to the reconverging router a PIM Join/Prune Message for each multicast group for which the neighboring router supports a downstream multicast group member.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
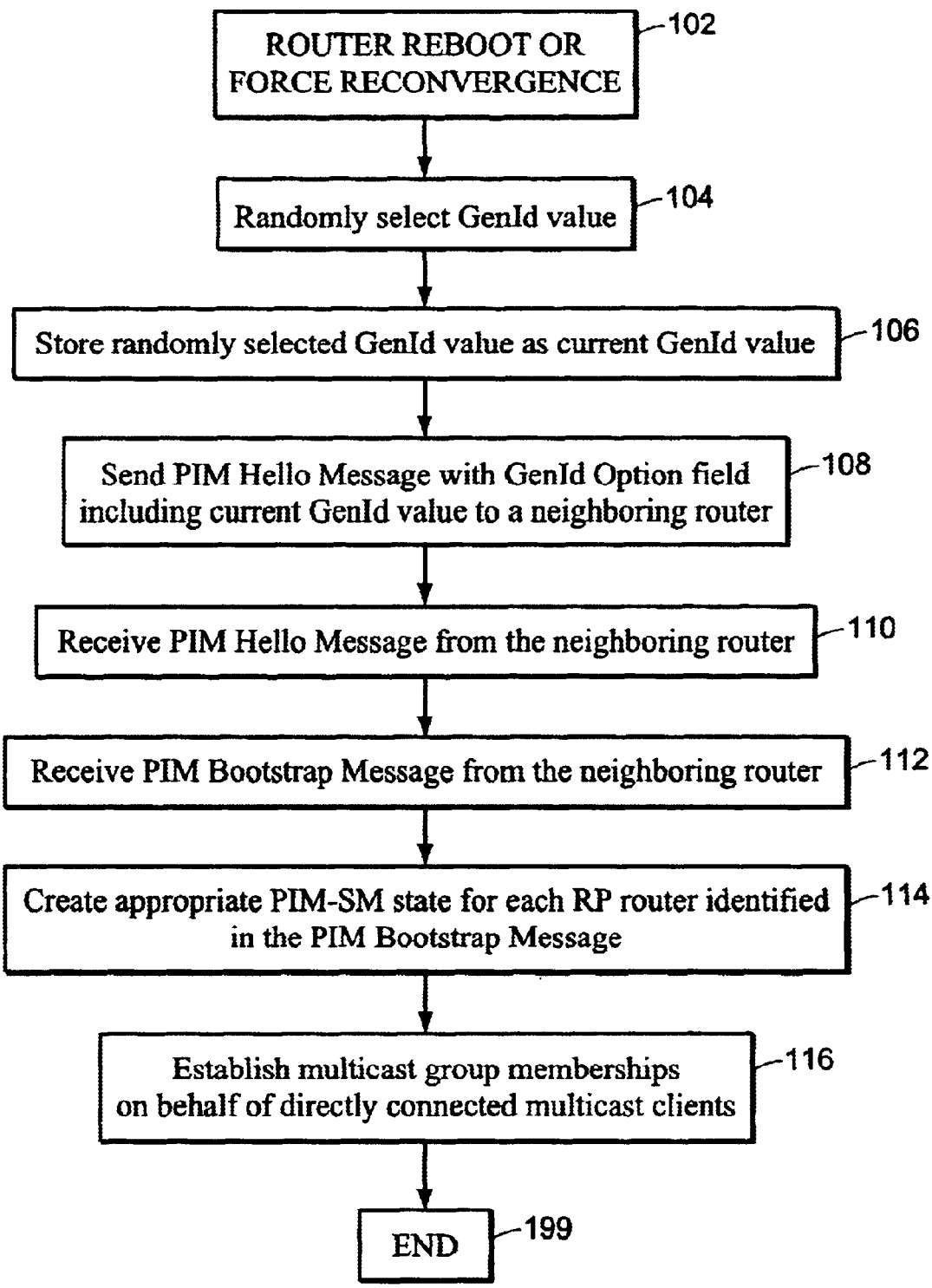
FIG. 1 is a logic flow diagram showing exemplary logic for forcing reconvergence by a router upon a router reboot or otherwise in accordance with a preferred embodiment of the present invention.

The present invention provides a technique for reducing reconvergence time of a PIM-SM router following a reboot. In order for the rebooted router to reconverge following a reboot, the rebooted router must at least learn the identity of the multicast group RP router, and may also need to learn the forwarding states for any downstream multicast group members. Therefore, a new option field, referred to hereinafter as the Generation Identifier (GenId) Option field, is defined for the PIM Hello message. The GenId Option field includes, among other things, a GenId value that is randomly selected each time the router reboots or otherwise requires reconvergence, and otherwise remains unchanged while the router is operational. When a router reboots, and after randomly selecting the GenId value, the router sends a PIM Hello message including the GenId Option field to its neighboring router(s). Each neighboring router compares the GenId value received in the PIM Hello message with a previous GenId value received from the router. If the GenId value received in the PIM Hello message does not match the previous GenId value received from the router (which will of course be true following a router reboot), then each neighboring router determines that the router rebooted, and immediately sends the PIM Bootstrap Message to the rebooted router including a list of all RP routers in the PIM-SM domain. Furthermore, each neighboring router that supports a downstream multicast group member also sends the PIM Join/Prune message to the rebooted router, which causes the rebooted router to join the shared tree by forwarding the PIM Join/Prune message toward the multicast group RP router. In this way, the rebooted router quickly reconverges without having to wait for a periodic PIM Bootstrap Message from the Bootstrap Router and without having to thereafter wait for a periodic PIM Join/Prune message from the neighboring router.

The following is the generic format of a PIM Hello Message in accordance with the PIM-SM protocol:

| PIM Ver | Type | Reserved | Checksum |
|---|---|---|---|
| OptionType | | | OptionLength |
| OptionValue | | | |

The "PIM Ver" field indicates the PIM version number, which is currently equal to two (2). The "Type" field indicates the PIM message type, which, for a PIM Hello message, is equal to zero (0). The "Checksum" field is a checksum value calculated for the entire PIM Hello Message. The PIM Hello Message may include one or more option fields in order to convey additional information to the neighboring router(s). Each option field includes the "OptionType" field, the "OptionLength" field, and the "OptionValue" field.

The following is the preferred format of the GenId Option field:

| OptionType = 20 | OptionLength = 4 |
|---|---|
| GenId | |

The preferred GenId Option field uses an "OptionType" value of twenty (20). The GenId value is a randomly selected 32-bit value.

When a PIM-SM router reboots, the rebooted router randomly selects a GenId value, and sends a PIM Hello Message to its neighboring router(s) including the GenId Option field with the randomly selected GenId value. Each neighboring router responds by sending a PIM Hello Message to the reboot router. Each neighboring router then compares the GenId value received in the PIM Hello Message to a previous GenId value received from the router. If the GenId value received in the PIM Hello message does not match the previous GenId value received from the router (which will of course be true following a router reboot), then each neighboring router determines that the router rebooted, and immediately sends the PIM Bootstrap Message to the rebooted router including a list of all RP routers in the PIM-SM domain. Upon receiving the PIM Bootstrap Message(s), the rebooted router creates the appropriate PIM-SM states in accordance with the PIM-SM protocol.

Furthermore, the rebooted router must rejoin the shared tree for each multicast group that includes a multicast group member downstream from the rebooted router. Therefore, each neighboring router that supports a downstream multicast group member sends a PIM Join/Prune Message to the rebooted router in order to prompt the rebooted router to rejoin the shared tree for the multicast group. Upon receiving a PIM Join/Prune Message from a particular neighboring router, the rebooted router creates appropriate routing entry for routing multicast packets to that neighboring router, and forwards the PIM Join/Prune message toward the multicast group RP router, in accordance with the PIM-SM protocol. It should be noted that any PIM Join/Prune Messages received by the router before the router learns the identity of the RP routers in the PIM-SM domain are dropped.

Furthermore, the rebooted router may have to join one or more shared trees on behalf of any directly connected multicast clients. Specifically, the rebooted router determines if it is the designated router for any directly connected multicast clients using a well-defined mechanism in the PIM-SM protocol. If the rebooted router is the designated router for at least one directly connected multicast client, then the rebooted router learns the multicast group membership information for its directly connected multicast client(s) using a well-known Internet Group Management Protocol (IGMP), and, in particular, learns each multicast group for which there is a directly connected member. Then, for each such multicast group, the rebooted router determines the corresponding multicast group RP router based upon the list of RP routers in the PIM Bootstrap Message using a well-defined mechanism in the PIM-SM protocol, creates the appropriate PIM-SM states and routing entries in accordance with the PIM-SM protocol, and sends a PIM Join/Prune Message toward the multicast group RP router.

In a preferred embodiment of the present invention, the GenId Option field is included in all PIM Hello Messages, not just in those PIM Hello Messages sent when a router reboots. Also, in order to interoperate with PIM-SM routers that do not support the GenId Option field, a router that receives a PIM Hello Message without a GenId Option field may consider the received GenId value to be zero (0), so that the GenId value does not change even after a router reboot.

It should be noted that a router can force a reconvergence without rebooting by simply selecting a new GenId value and including the new GenId value in a subsequent PIM Hello Message. In this way, the neighboring router is fooled into detecting a router reboot, and responds accordingly by sending the PIM Bootstrap Message and, if necessary, the additional PIM Join/Prune Message(s).

FIG. 1 is a logic flow diagram showing exemplary logic for forcing reconvergence by a router upon a router reboot or otherwise. Beginning in step 102, the logic randomly selects a GenId value, in step 104, and stores the randomly selected GenId value as the current GenId value, in step 106. The logic then sends a PIM Hello Message with a GenId Option field including the current GenId value to each neighboring router, in step 108. From each neighboring router, the logic receives a PIM Hello Message, in step 110, and a PIM Bootstrap Message, in step 112. Upon receiving the PIM Bootstrap Message in step 112, the logic creates the appropriate PIM-SM states for each RP router identified in the PIM Bootstrap Message in accordance with the PIM-SM protocol, in step 114. The logic then proceeds to establish multicast group memberships on behalf of any directly connected multicast clients, in step 116, specifically by determining if the router is the designated router, learning the multicast group membership information for its directly connected multicast client(s) if the router is the designated router, determining the corresponding RP router for each multicast group membership, and creating the appropriate PIM-SM states and routing entries for the multicast group memberships, and sending a PIM Join/Prune Message to each multicast group RP router. The logic terminates in step 199.

Figure 2:
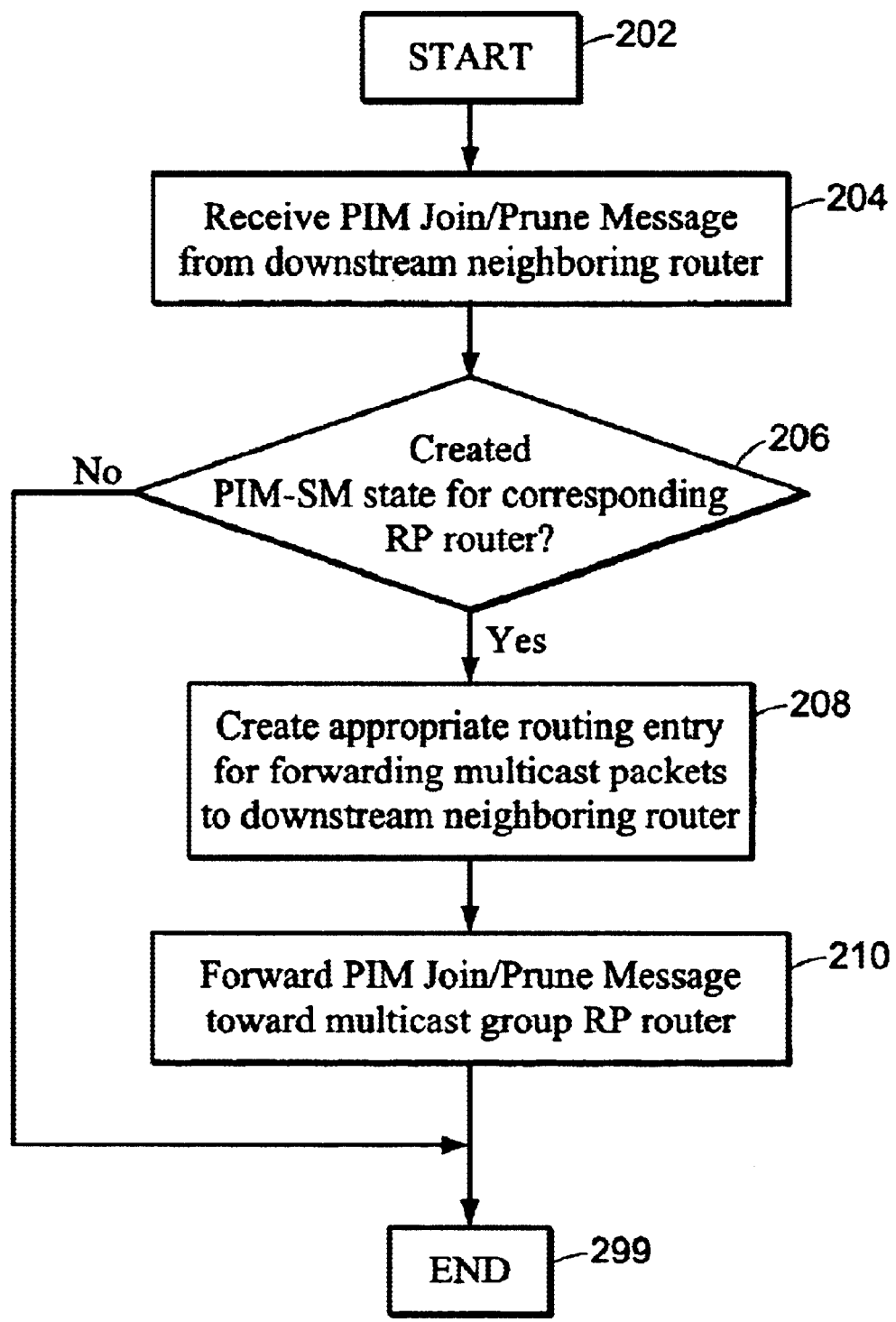
FIG. 2 is a logic flow diagram showing exemplary logic for processing a PIM Join/Prune Message by a router during reconvergence in accordance with a preferred embodiment of the present invention.

FIG. 2 is a logic flow diagram showing exemplary logic for processing a PIM Join/Prune Message by a router during reconvergence. Beginning in step 202, and upon receiving the PIM Join/Prune Message from a downstream neighboring router in step 204, the logic determines if the appropriate PIM-SM state has been created for the corresponding multicast group RP router. If the appropriate PIM-SM state has not yet been created for the corresponding multicast group RP router (NO in step 206), then the logic drops the PIM Join/Prune Message, and terminates in step 299. However, if the appropriate PIM-SM state has been created for the corresponding multicast group RP router (YES in step 206), then the logic creates the appropriate routing entry for forwarding multicast packet to the downstream neighboring router, in step 208, and forwards the PIM Join/Prune Message towards the multicast group RP router, in step 210. The logic terminates in step 299.

Figure 3:
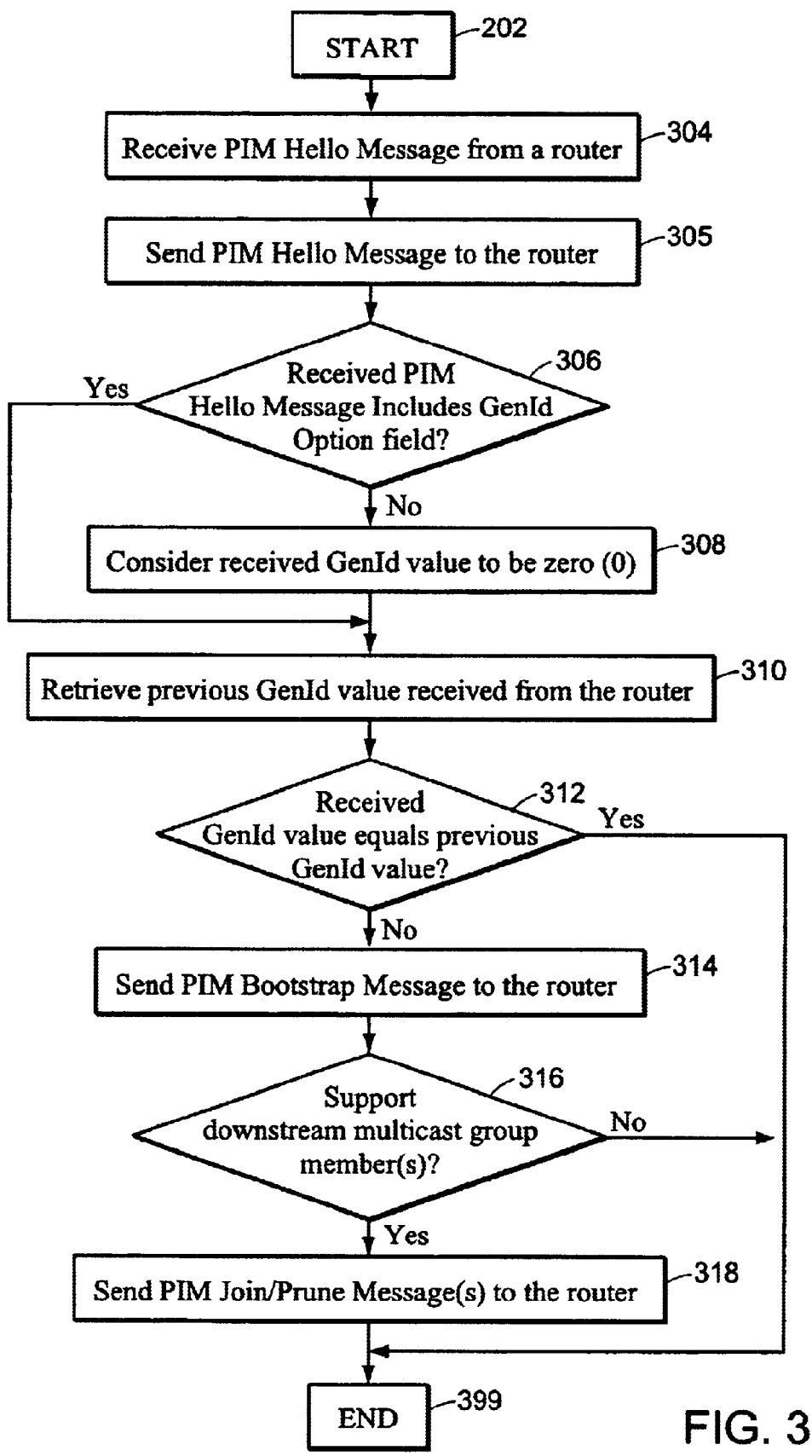
FIG. 3 is a logic flow diagram showing exemplary logic for processing a PIM Hello Message by a neighboring router in accordance with a preferred embodiment of the present invention.

FIG. 3 is a logic flow diagram showing exemplary logic for processing a PIM Hello Message by a neighboring router. Beginning in step 302, and upon receiving the PIM Hello Message from the router in step 304, the logic sends a PIM Hello Message to the router, in step 305. The logic then determines whether the received PIM Hello Message includes the GenId Option field. If the received PIM Hello Message includes the GenId Option field (YES in step 306), then the logic proceeds to step 310, using the received GenId value from the GenId Option field in the received PIM Hello Message. If the received PIM Hello Message does not include the GenId Option field (NO in step 306), then the logic considers the received GenId value to be zero (0), in step 308, and proceeds to step 310.

In step 310, the logic retrieves the previous GenId value received from the router. If no previous GenId value was received by the router, then the previous GenId value is considered to be zero (0). The logic then compares the received GenId value with the previous GenId value. If the received GenId value is equal to the previous GenId value (YES in step 312), then the logic terminates in step 399. However, assuming the received GenId value is not equal to the previous GenId value (NO in step 312), then the logic sends a PIM Bootstrap Message to the router in step 314. The logic then proceeds to determine whether there are any downstream multicast group members. If there is at least one downstream multicast group member (YES in step 316), then the logic sends a PIM Join/Prune Message to the router for each multicast group membership supported, in step 318. The logic terminates in step 399.

During the processing of the PIM Hello Message, the neighboring router stores the received GenId value (i.e., either the GenId value received in the PIM Hello Message, if the GenId Option field was present in the PIM Hello Message, or the default value zero (0), if the GenId Option field was not present in the PIM Hello Message) use in processing subsequent PIM Hello Messages received from the same router.

Figure 4:
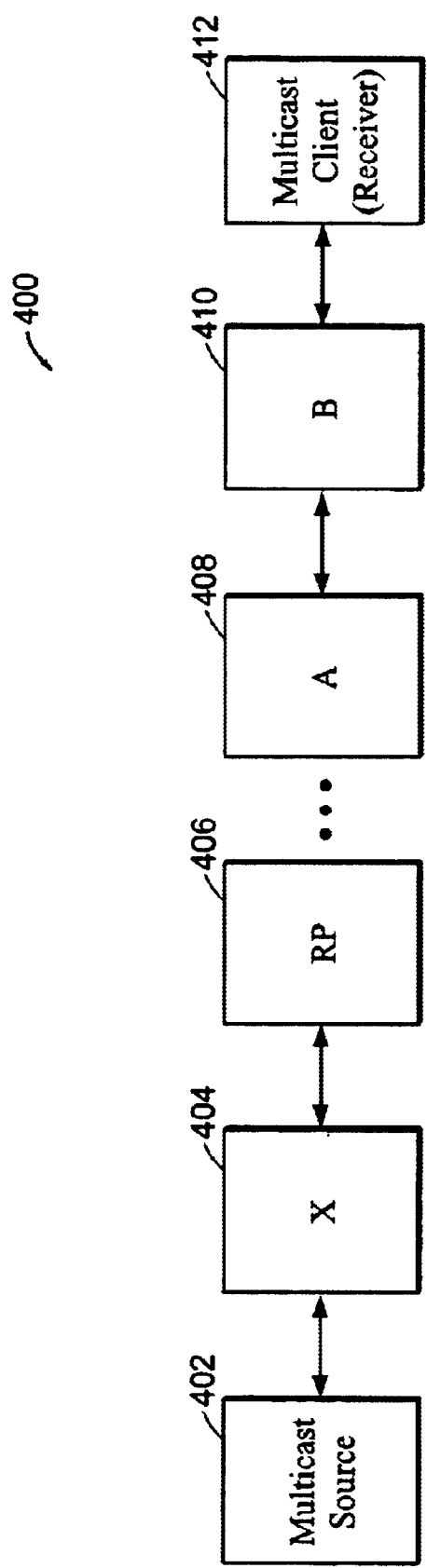
FIG. 4 is a block diagram showing an exemplary communication system in accordance with a preferred embodiment of the present invention.

The various techniques of the present invention can be demonstrated by example. FIG. 4 shows an exemplary communication system 400 including a Multicast Source 402, a Router X 404, a RP Router 406, a Router A 408, a Router B 410, and a Multicast Client 412, all within a PIM-SM domain. All of the routers in the communication system 400 utilize the PIM-SM protocol to establish a shared tree by which multicast packets from the Multicast Source 402 (and possibly other multicast sources that are not shown) are distributed to the Multicast Client 412 (and possibly to other multicast clients that are not shown). Specifically, within the communication system 400, the Router X 404 forwards all multicast packets from the Multicast Source 402 to the RP Router 406, which in turn forwards the multicast packets according to the shared tree. In order for the Multicast Client 412 to receive multicast packets from the Multicast Source 402, the Router A 408 and the Router B 410 must join the shared tree. In the following discussion, the terms "upstream" and "downstream" are used to describe the relative position of two devices, where the "upstream" device is the device closer to the Multicast Source 402, and the "downstream" device is the device closer to the Multicast Client 412. For example, Router A 408 is upstream from Router B 410, and Router B 410 is therefore downstream from Router A 408.

In a first scenario, the Router A 408 reboots or otherwise requires reconvergence. The Router A 408 randomly selects a GenId value, and sends a PIM Hello Message with a GenId Option field including the randomly selected GenId value to each of its neighboring routers, which in this example includes the Router B 410. The Router B 410 sends a PIM Hello Message to the Router A 408 in order to acknowledge receipt of the PIM Hello Message from the Router A 408. The Router B 410 determines that the Router A 408 has reboot by comparing the received GenId value to a previous GenId value received from the Router A 408. The Router B 410 therefore sends a PIM Bootstrap Message to the Router A 408 identifying each RP router in the PIM-SM domain, including the RP Router 406. Upon receiving the PIM Bootstrap Message from the Router B 410, the Router A 408 creates the appropriate PIM-SM states in accordance with the PIM-SM protocol. The Router B 410 also determines that it supports a downstream multicast group member, specifically the Multicast Client 412. The Router B 410 therefore sends a PIM Join/Prune Message to the Router A 408 in order to join the corresponding multicast group on behalf of the Multicast Client 412. Upon receiving the PIM Join/Prune Message from the Router B 410, the Router A 408 creates the appropriate routing entry, and forwards the PIM Join/Prune message upstream toward the RP Router 406 in order to join the shared tree for the multicast group.

Figure 5:
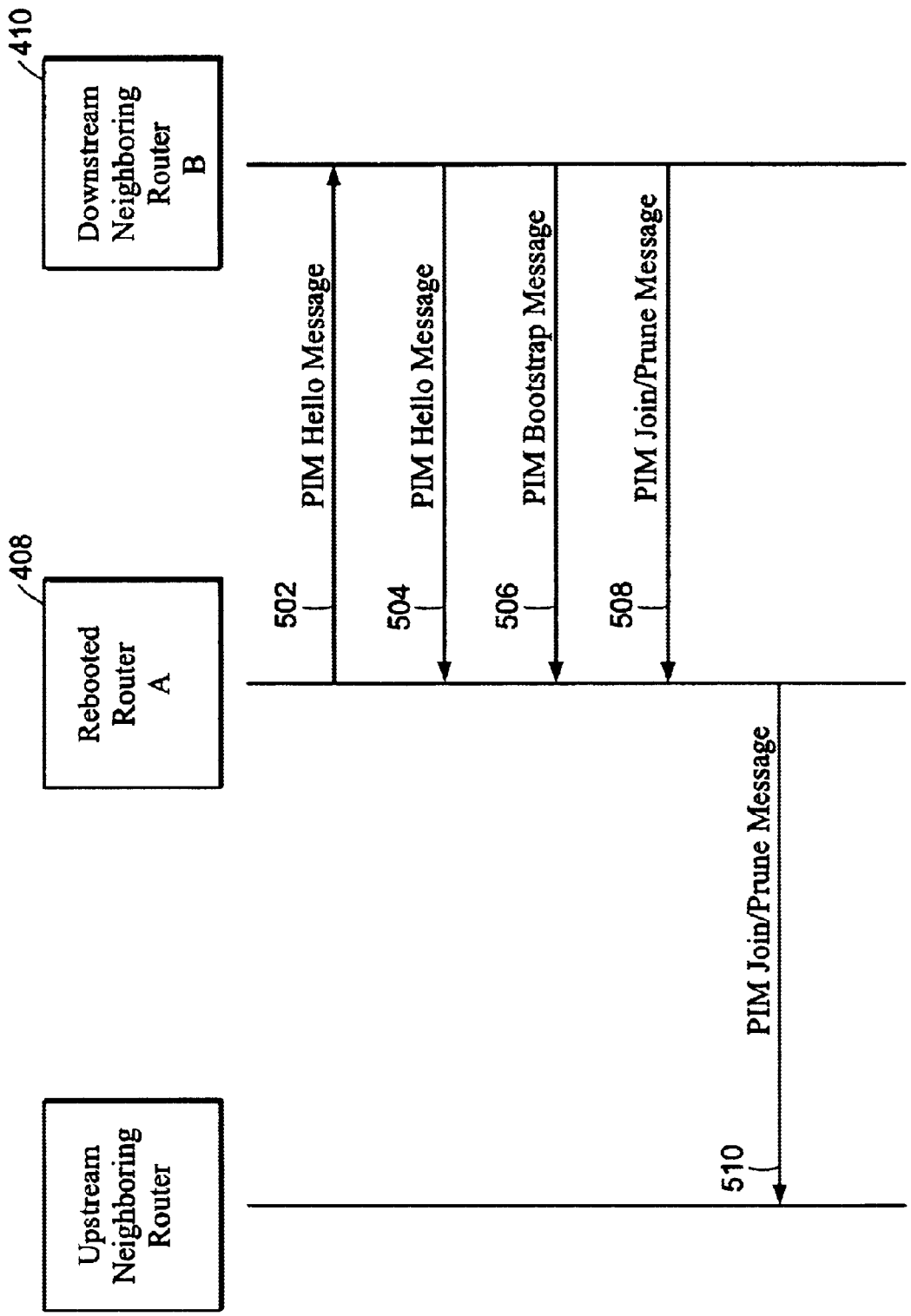
FIG. 5 is a message flow diagram showing a first exemplary message flow for reconverging a router in accordance with a preferred embodiment of the present invention.

FIG. 5 is a message flow diagram showing an exemplary message flow for reconverging the Router A 408. Upon a Router A 408 reboot, or at any time the Router A 408 forces reconvergence, the Router A 408 randomly selects a GenId value, and sends a PIM Hello Message 502 with a GenId Option field including the randomly selected GenId value to each of its neighboring routers, which in this example includes the Router B 410. The Router B 410 sends a PIM Hello Message 504 to the Router A 408 in order to acknowledge receipt of the PIM Hello Message 502 from the Router A 408. The Router B 410 determines that the Router A 408 has reboot by comparing the received GenId value to a previous GenId value received from the Router A 408. The Router B 410 therefore sends a PIM Bootstrap Message 506 to the Router A 408 identifying each RP router in the PIM-SM domain, including the RP Router 406. Upon receiving the PIM Bootstrap Message 506 from the Router B 410, the Router A 408 creates the appropriate PIM-SM states in accordance with the PIM-SM protocol. The Router B 410 also determines that it supports a downstream multicast group member, specifically the Multicast Client 412. The Router B 410 therefore sends a PIM Join/Prune Message 508 to the Router A 408 in order to join the corresponding multicast group on behalf of the Multicast Client 412. Upon receiving the PIM Join/Prune Message from the Router B 410, the Router A 408 creates the appropriate routing entry, and forwards the PIM Join/Prune message 508 upstream toward the RP Router 406 as the PIM Join/Prune Message 510 in order to join the shared tree for the multicast group.

In a second scenario, the Router B 410 reboots or otherwise requires reconvergence. The Router B 410 randomly selects a GenId value, and sends a PIM Hello Message with a GenId Option field including the randomly selected GenId value to each of its neighboring routers, which in this example includes the Router A 408. The Router A 408 sends a PIM Hello Message to the Router B 410 in order to acknowledge receipt of the PIM Hello Message from the Router B 410. The Router A 408 determines that the Router B 410 has reboot by comparing the received GenId value to a previous GenId value received from the Router B 410. The Router A 408 therefore sends a PIM Bootstrap Message to the Router B 410 identifying each RP router in the PIM-SM domain, including the RP Router 406. Upon receiving the PIM Bootstrap Message from the Router A 408, the Router B 410 creates the appropriate PIM-SM states in accordance with the PIM-SM protocol. However, because the Router A 408 is upstream from the Router B 410, the Router A 408 does not send a PIM Join/Prune Message to the Router B 410.

The Router B 410 uses an IGMP message exchange to determine that it supports a downstream multicast group member, specifically the Multicast Client 412. The Router B 410 therefore creates the appropriate routing entry, and sends a PIM Join/Prune Message to the Router A 408 in order to join the corresponding multicast group on behalf of the Multicast Client 412. Upon receiving the PIM Join/Prune Message from the Router B 410, the Router A 408 creates the appropriate routing entry, and forwards the PIM Join/Prune Message upstream toward the RP Router 406 in order to join the shared tree for the multicast group.

Figure 6:
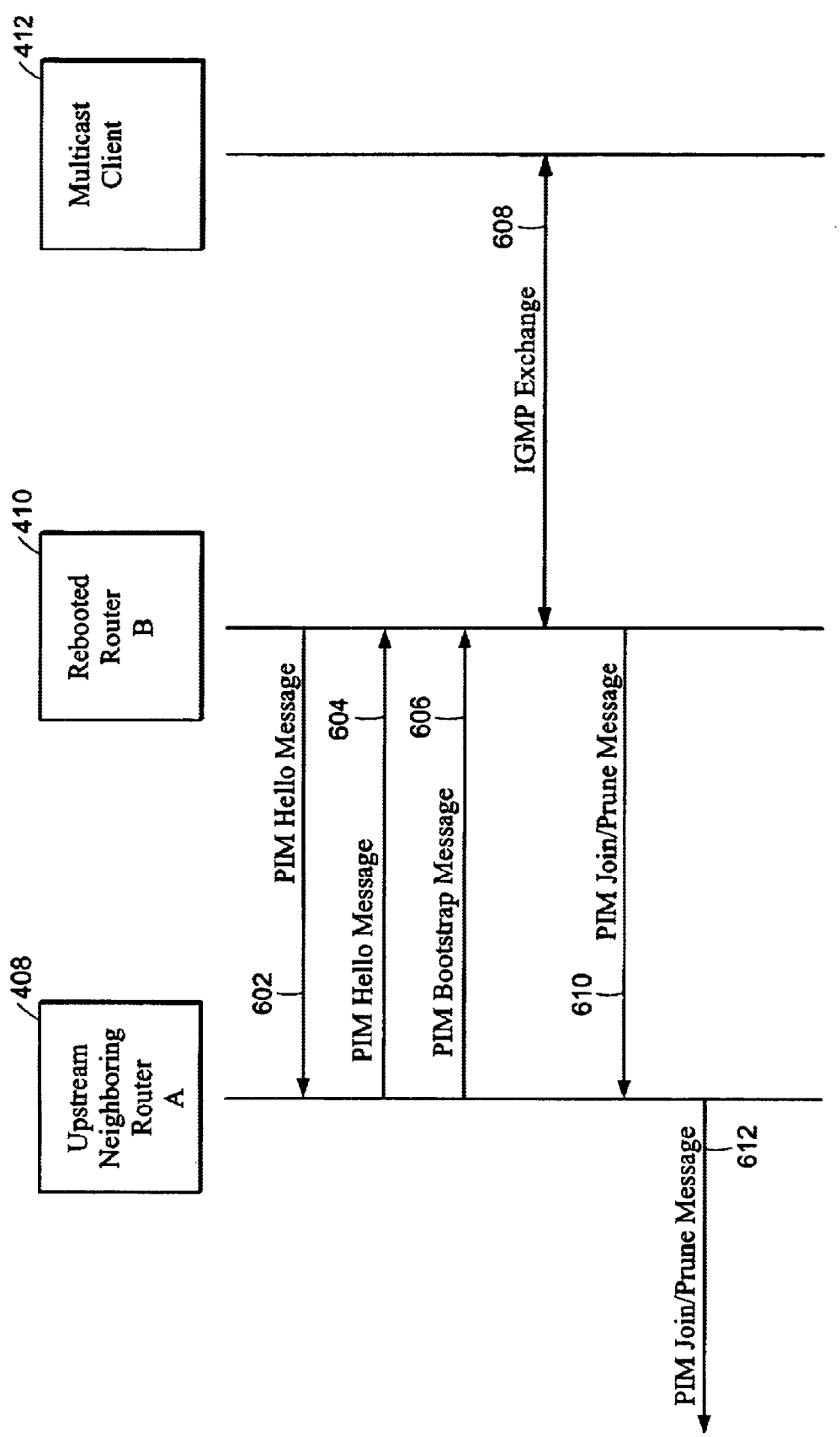
FIG. 6 is a message flow diagram showing a second exemplary message flow for reconverging a router in accordance with a preferred embodiment of the present invention.

FIG. 6 is a message flow diagram showing an exemplary message flow for reconverging the Router B 410. Upon a Router B 410 reboot, or at any time the Router B 410 forces reconvergence, the Router B 410 randomly selects a GenId value, and sends a PIM Hello Message 602 with a GenId Option field including the randomly selected GenId value to each of its neighboring routers, which in this example includes the Router A 408. The Router A 408 sends a PIM Hello Message 604 to the Router B 410 in order to acknowledge receipt of the PIM Hello Message 602 from the Router B 410. The Router A 408 determines that the Router B 410 has reboot by comparing the received GenId value to a previous GenId value received from the Router B 410. The Router A 408 therefore sends a PIM Bootstrap Message 606 to the Router B 410 identifying each RP router in the PIM-SM domain, including the RP Router 406. Upon receiving the PIM Bootstrap Message 606 from the Router A 408, the Router B 410 creates the appropriate PIM-SM states in accordance with the PIM-SM protocol. However, because the Router A 408 is upstream from the Router B 410, the Router A 408 does not send a PIM Join/Prune Message to the Router B 410.

The Router B 410 uses an IGMP message exchange 608 to determine that it supports a downstream multicast group member, specifically the Multicast Client 412. The Router B 410 therefore creates the appropriate routing entry, and sends a PIM Join/Prune Message 610 to the Router A 408 in order to join the corresponding multicast group on behalf of the Multicast Client 412. Upon receiving the PIM Join/Prune Message 610 from the Router B 410, the Router A 408 creates the appropriate routing entry, and forwards the PIM Join/Prune Message 610 upstream toward the RP Router 406 as the PIM Join/Prune Message 612 in order to join the shared tree for the multicast group.

In a third scenario, the Router X 404 reboots or otherwise requires reconvergence. The Router X 404 randomly selects a GenId value, and sends a PIM Hello Message with a GenId Option field including the randomly selected GenId value to each of its neighboring routers. The Router X 404 receives a PIM Hello Message from a neighboring router, and also receives a PIM Bootstrap Message from the neighboring router. Upon receiving the PIM Bootstrap Message from the neighboring router, the Router X 404 creates the appropriate PIM-SM states in accordance with the PIM-SM protocol. Thereafter, the Router X 404 forwards all multicast packets from the Multicast Source 402 to the RP Router 406.

EXTENSION TO PIM-SM PROTOCOL

The GenId Option field and the above-mentioned techniques for reducing reconvergence time using the GenId Option field are preferably embodied as an extension to the PIM-SM protocol. The following is the substantive text of an INTERNET-DRAFT memo that was prepared for submission to the Internet Engineering Task Force (IETF) based upon a preferred embodiment of the present invention. Certain information, such as page headers, page footers, title, document status, acknowledgments, and authors' contact information has been omitted for convenience and clarity.

Abstract

This draft specifies the Generation Identifier (GenId) Option in PIM Hello messages. This option helps reduce network convergence time in PIM running Sparse Mode.

1. Introduction

The current default PIM Hello interval is 30 seconds and its holdtime is 105 seconds. If a neighbor is rebooted within this holdtime, all other neighbors on the LAN will not be able to detect this transition. Thus, in the case of PIM Sparse Mode, the rebooted neighbor will take longer to learn its RP-Set information causing longer outage of traffic flows through this neighbor. In the worst case, the rebooted neighbor was the elected BSR or a Candidate BSR in which case the BSR election process will take place unnecessarily even if its configuration stay the same.

A GenId is randomly selected when the router boots and remains the same as long as the router is up. By including this GenId as an option in the Hello packet, a neighbor reboot can easily be detected if its GenId is different from before. When such an event happens, the DR on the LAN unicasts its most recent RP-Set information to the rebooted neighbor. If the rebooted neighbor was the DR, the next highest ip address (or the next highest DR priority if this option is enabled) neighbor will unicast the information.

2. Generation Identifier Option

The GenId is a 32-bit unsigned number. This number is randomly assigned when the router boots up and remains the same for the router's up time. This is usually taken from the router's wall clock in seconds.

A router may intentionally regenerate a new GenId in order to synchronize its RP-set information and forwarding states with its neighboring routers.

If no GenId option is specified in a Hello message, the Hello sender is deemed not capable of handling the GenId option. When such a hello message is received, the receiver will just treat it as zero. This way new systems can interoperate with older systems in the old way.

The GenId received in a Hello is kept until the next Hello from the same system arrives. The newly received GenId replaces the cached GenId for the same neighbor if its GenId has changed.

An implementation capable of doing this option should always include it in the Hellos even if no GenId option is explicitly configured.

The following is the format of this option.

OptionType: 20
OptionLength: 4

| OptionType = 20 | OptionLength = 4 |
|---|---|
| GenId ||

3. Triggering Hello Message

In order to minimize delay, a Hello message should immediately be sent upon boot up. After learning a new GenId from a neighbor, router should unicast a Hello message to the neighbor after a random delay. This is to trigger the neighbor to establish neighborship with all routers as soon as possible.

4. Triggering Behaviours in PIM-SM

After learning a new GenId from a neighbor, if it determines itself is the DR (or the next available DR if the neighbor was the DR), the router should unicast a Bootstrap message to the neighbor after sending the above Hello message. Aside, for each forwarding state with the neighbor as the upstream, the router should subsequently send Join/Prune messages to this neighbor.

5. Acknowledgments

6. References

[PIM-SM] D. Estrin et al, Protocol Independent Multicast Sparse-Mode (PIM-SM): Protocol Specification. RFC 2362, June 1998.

[PIM-DM] S. Deering et al, Protocol Independent Multicast Version 2 Dense Mode Specification. Internet Draft, work in progress, November 1998.

ALTERNATIVE EMBODIMENTS OF THE PRESENT INVENTION

In accordance with the present invention, a reconverging device sends to a neighboring device a reconvergence message including a reconvergence indicator. In a preferred embodiment of the present invention, the reconvergence message is a PIM Hello Message, and the reconvergence indicator is a randomly selected GenId value that is included in a novel GenId Option field within the PIM Hello Message. However, the present invention is in no way limited to any particular reconvergence message or reconvergence indicator. For example, the reconvergence method may be a PIM Hello Message or other PIM message, including an entirely new PIM message that is used to explicitly notify the neighboring device that the reconverging device requires reconvergence. The reconvergence indicator may be any of a variety of indicator types including, but in no way limited to, a reconvergence event indicator explicitly indicating that reconvergence is required or a value that changes over time, such as a randomly selected value, a timestamp, or a counter that is incremented for each device reconvergence. These and other alternative embodiments are intended to fall within the scope of the present invention.

In a preferred embodiment of the present invention, the GenId Option field includes only the GenId value (that is, in addition to the OptionType and OptionLength fields). However, the present invention is in no way limited to a specific format for the GenId Option field. The GenId value may be included along with additional information in the GenId Option field, or the GenId value may be incorporated into other PIM messages and/or PIM option fields. In one alternative embodiment, the GenId Option field includes a list of neighboring routers. These and other alternative embodiments are intended to fall within the scope of the present invention.

In a preferred embodiment of the present invention, predominantly all of the logic for reducing reconvergence time is implemented as a set of computer program instructions that are stored in a computer readable medium and executed by an embedded microprocessor system within the routers. Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or it distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

We claim:

1. A method for reducing reconvergence time by a reconverging device in a PIM-SM domain of a communication system, the method comprising the steps of:

sending to a neighboring device a reconvergence message including a reconvergence indicator; and receiving from the neighboring device a PIM Bootstrap Message identifying at least a Rendezvous Point device in the PIM-SM domain.

2. The method of claim 1, wherein the reconvergence message is a PIM Hello Message.

3. The method of claim 1, wherein the reconvergence indicator is a randomly selected Generation Identifier value included in a Generation Identifier Option field.

4. The method of claim 1, further comprising the step of creating a PIM-SM state for the Rendezvous Point device upon receiving the PIM Bootstrap Message.

5. The method of claim 4, further comprising the steps of:

receiving from the neighboring device a PIM Join/Prune Message for joining a specified multicast group;

creating a routing entry for the multicast group; and forwarding the PIM Join/Prune Message toward the Rendezvous Point device.

6. The method of claim 1, further comprising the steps of:

detecting a directly connected multicast group member; and sending to the neighboring device a PIM Join/Prune Message for joining the multicast group on behalf of the directly connected multicast group member.

7. A reconverging device for operating in a PIM-SM domain of a communication system, the reconverging device comprising:

reconvergence message transmitting logic operably coupled to send to a neighboring device a reconvergence message including a reconvergence indicator; and PIM Bootstrap Message receiving logic operably coupled to receive from the neighboring device a PIM Bootstrap Message identifying at least a Rendezvous Point device within the PIM-SM domain.

8. The reconverging device of claim 7, wherein the reconvergence message is a PIM Hello Message.

9. The reconverging device of claim 7, wherein the reconvergence indicator is a randomly selected Generation Identifier value included in a Generation Identifier Option field.

10. The reconverging device of claim 7, further comprising PIM state logic responsive to the PIM Bootstrap Message receiving logic and operably coupled to create a PIM-SM state for the Rendezvous Point device upon receiving the PIM Bootstrap Message by the PIM Bootstrap Message receiving logic.

11. The reconverging device of claim 10, further comprising the steps of:

PIM Join/Prune Message receiving logic operably coupled to receive from the neighboring device a PIM Join/Prune Message for joining a specified multicast group;

PIM routing logic responsive to the PIM Join/Prune Message receiving logic and operably coupled to create a routing entry for the multicast group upon receiving the PIM Join/Prune Message by the PIM Join/Prune Message receiving logic; and PIM Join/Prune Message forwarding logic operably coupled to forward the PIM Join/Prune Message toward the Rendezvous Point device.

12. The reconverging device of claim 7, further comprising:

IGMP logic operably coupled to detect a directly connected multicast group member; and PIM Join/Prune Message transmitting logic responsive to the IGMP logic and operably coupled to send to the neighboring device a PIM Join/Prune Message for joining the multicast group on behalf of the directly connected multicast group member.

13. A program product comprising a computer readable medium having embodied therein a computer program for reducing reconvergence time by a reconverging device in a PIM-SM domain of a communication system, the computer program comprising:

reconvergence message transmitting logic programmed to send to a neighboring device a reconvergence message including a reconvergence indicator; and PIM Bootstrap Message receiving logic programmed to receive from the neighboring device a PIM Bootstrap Message identifying at least a Rendezvous Point device within the PIM-SM domain.

14. The program product of claim 13, wherein the reconvergence message is a PIM Hello Message.

15. The program product of claim 13, wherein the reconvergence indicator is a randomly selected Generation Identifier value included in a Generation Identifier Option field.

16. The program product of claim 13, further comprising PIM state logic responsive to the PIM Bootstrap Message receiving logic and programmed to create a PIM-SM state for the Rendezvous Point device upon receiving the PIM Bootstrap Message by the PIM Bootstrap Message receiving logic.

17. The program product of claim 16, further comprising the steps of:

PIM Join/Prune Message receiving logic programmed to receive from the neighboring device a PIM Join/Prune Message for joining a specified multicast group;

PIM routing logic responsive to the PIM Join/Prune Message receiving logic and programmed to create a routing entry for the multicast group upon receiving the PIM Join/Prune Message by the PIM Join/Prune Message receiving logic; and PIM Join/Prune Message forwarding logic programmed to forward the PIM Join/Prune Message toward the Rendezvous Point device.

18. The program product of claim 13, further comprising:

IGMP logic programmed to detect a directly connected multicast group member; and PIM Join/Prune Message transmitting logic responsive to the IGMP logic and programmed to send to the neighboring device a PIM Join/Prune Message for joining the multicast group on behalf of the directly connected multicast group member.

19. A method for reducing reconvergence time by a neighboring device in a PIM-SM domain of a communication system, the method comprising the steps of:

receiving from a reconverging device a reconvergence message including a reconvergence indicator; and sending to the reconverging device a PIM Bootstrap Message identifying at least a Rendezvous Point device in the PIM-SM domain.

20. The method of claim 19, wherein the reconvergence message is a PIM Hello Message.

21. The method of claim 19, wherein the reconvergence indicator is a randomly selected Generation Identifier value included in a Generation Identifier Option field.

22. The method of claim 19, further comprising the steps of:

detecting a supported downstream multicast group member; and sending to the reconverging device a PIM Join/Prune Message for joining the multicast group.

23. A neighboring device for operation in a PIM-SM domain of a communication system, the neighboring device comprising:

reconvergence message receiving logic operably coupled to receive from a reconverging device a reconvergence message including a reconvergence indicator; and PIM Bootstrap Message transmitting logic responsive to the reconvergence message receiving logic and operably coupled to send to the reconverging device a PIM Bootstrap Message identifying at least a Rendezvous Point device in the PIM-SM domain.

24. The neighboring device of claim 23, wherein the reconvergence message is a PIM Hello Message.

25. The neighboring device of claim 23, wherein the reconvergence indicator is a randomly selected Generation Identifier value included in a Generation Identifier Option field.

26. The neighboring device of claim 23, further comprising:

multicast group membership logic operably coupled to detect a supported downstream multicast group member; and PIM Join/Prune Message transmitting logic responsive to the multicast group membership logic and operably coupled to send to the reconverging device a PIM Join/Prune Message for joining the multicast group.

27. A program product comprising a computer readable medium having embodied therein a computer program for reducing reconvergence time by a neighboring device in a PIM-SM domain of a communication system, the computer program comprising:

reconvergence message receiving logic programmed to receive from a reconverging device a reconvergence message including a reconvergence indicator; and PIM Bootstrap Message transmitting logic responsive to the reconvergence message receiving logic and programmed to send to the reconverging device a PIM Bootstrap Message identifying at least a Rendezvous Point device in the PIM-SM domain.

28. The program product of claim 27, wherein the reconvergence message is a PIM Hello Message.

29. The program product of claim 27, wherein the reconvergence indicator is a randomly selected Generation Identifier value included in a Generation Identifier Option field.

30. The program product of claim 27, further comprising:

multicast group membership logic programmed to detect a supported downstream multicast group member; and PIM Join/Prune Message transmitting logic responsive to the multicast group membership logic and programmed to send to the reconverging device a PIM Join/Prune Message for joining the multicast group.

31. A method for reconverging a device in a PIM-SM domain of a communication system, the method comprising the steps of:

sending, by a reconverging device to a neighboring device, a reconvergence message including a reconvergence indicator;

receiving the reconverging message by the neighboring device; and sending, by the neighboring device to the reconverging device, a PIM Bootstrap Message identifying at least a Rendezvous Point device in the PIM-SM domain.

32. The method of claim 31, wherein the reconvergence message is a PIM Hello Message.

33. The method of claim 31, wherein the reconvergence indicator is a randomly selected Generation Identifier value included in a Generation Identifier Option field.

34. The method of claim 31, further comprising the step of creating a PIM-SM state for the Rendezvous Point device by the reconverging device upon receiving the PIM Bootstrap Message from the neighboring device.

35. The method of claim 34, further comprising the steps of:

detecting a supported downstream multicast group member by the neighboring device;

sending, by the neighboring device to the reconverging device, a PIM Join/Prune Message for joining the multicast group;

receiving the PIM Join/Prune Message by the reconverging device;

creating a routing entry for the multicast group by the reconverging device; and forwarding the PIM Join/Prune Message by the reconverging device toward the Rendezvous Point device.

36. The method of claim 31, further comprising the steps of:

detecting a directly connected multicast group member by the reconverging device; and sending, by the reconverging device to the neighboring device, a PIM Join/Prune Message for joining the multicast group on behalf of the directly connected multicast group member.

37. A communication system comprising a reconverging device in communication with a neighboring device and a Rendezvous Point device in the PIM-SM domain, wherein the reconverging device sends to the neighboring device a reconvergence message including a reconvergence indicator, and wherein the neighboring device sends a PIM Bootstrap Message to the reconverging device upon receiving the reconverging message.

38. The communication system of claim 37, wherein the reconvergence message is a PIM Hello Message.

39. The communication system of claim 37, wherein the neighboring device further sends a PIM Join/Prune Message to the reconverging device for joining a multicast group on behalf of a supported downstream multicast group member.

40. The communication system of claim 37, wherein the reconverging device sends a PIM Join/Prune Message to the neighboring device for joining a multicast group on behalf of a directly connected multicast group member.

* * * * *